US009229522B1

United States Patent
Tian et al.

(10) Patent No.: US 9,229,522 B1
(45) Date of Patent: Jan. 5, 2016

(54) MOBILE BATTERY PERFORMANCE BY IDENTIFYING APPS THAT DISPROPORTIONALLY RUN BACKGROUND TASKS THAT PREVENT MOBILE DEVICES FROM SLEEPING

(71) Applicant: Symantec Corporation, Mountain View, CA (US)

(72) Inventors: Xue Feng Tian, Beijing (CN); Bruce McCorkendale, Manhattan Beach, CA (US)

(73) Assignee: Symantec Corporation, Mountain View, CA (US)

( * ) Notice: Subject to any disclaimer, the term of this patent is extended or adjusted under 35 U.S.C. 154(b) by 303 days.

(21) Appl. No.: 14/010,926

(22) Filed: Aug. 27, 2013

(51) Int. Cl.
| | |
|---|---|
| G06F 1/00 | (2006.01) |
| G06F 1/32 | (2006.01) |
| G06F 9/44 | (2006.01) |
| H04M 1/725 | (2006.01) |
| G06F 3/041 | (2006.01) |
| G06F 1/16 | (2006.01) |
| G06F 11/20 | (2006.01) |
| G06F 3/0488 | (2013.01) |

(52) U.S. Cl.
CPC .............. *G06F 1/3234* (2013.01); *G06F 1/169* (2013.01); *G06F 1/3265* (2013.01); *G06F 3/041* (2013.01); *G06F 3/0416* (2013.01); *G06F 3/0488* (2013.01); *G06F 9/44* (2013.01); *G06F 9/4418* (2013.01); *G06F 11/2035* (2013.01); *H04M 1/72544* (2013.01); *H04M 1/72577* (2013.01)

(58) Field of Classification Search
CPC ... G06F 1/3265; G06F 3/0416; G06F 3/0488; G06F 9/44; G06F 9/4418; H04M 1/72544; H04M 1/72577
USPC .................................. 713/300, 320, 323, 324
See application file for complete search history.

(56) References Cited

U.S. PATENT DOCUMENTS

| | | | | |
|---|---|---|---|---|
| 2011/0040996 A1* | 2/2011 | Hackborn | ........... | G06F 11/3409 713/340 |
| 2013/0268257 A1* | 10/2013 | Hu | ....................... | G06F 17/5009 703/22 |

\* cited by examiner

*Primary Examiner* — Michael J Brown
(74) *Attorney, Agent, or Firm* — Brill Law Office; Jeffrey Brill

(57) ABSTRACT

Power consumption on a mobile computing device is reduced, by identifying and managing apps that prevent the mobile device from sleeping while the screen is off. It is detected when the screen is turned off and when it is subsequently turned back on. During the ensuing period of time, it is determined which specific apps prevent the mobile device from sleeping. This can take the form of identifying each specific app on the mobile device that has an unreleased wake lock at any point during the given period of time while the screen is off. The prevention of the device from sleeping while the screen was off is quantified by app according to power consumption, based on factors such as duration. Any apps for which the quantified prevention of the mobile device from sleeping while the screen was off meets a specific threshold are identified and managed.

20 Claims, 4 Drawing Sheets

MOBILE BATTERY PERFORMANCE BY IDENTIFYING APPS THAT DISPROPORTIONALLY RUN BACKGROUND TASKS THAT PREVENT MOBILE DEVICES FROM SLEEPING

TECHNICAL FIELD

This disclosure pertains generally to managing mobile battery performance, and more specifically to improving battery performance on mobile computing devices by identifying and managing apps that disproportionally prevent the mobile device from sleeping when the screen is off.

BACKGROUND

Mobile computing devices such as smartphones and tablets are becoming more widely used every day. Android is an open-source, Linux based operating system for such mobile devices. Android, which continues to gain increasingly prevalent market share, accounted for approximately 80% of all smartphones shipped in the second quarter of 2013. A large community of developers write applications ("apps") that run on Android devices. Many Android apps are available either for purchase or for free through Google Play (formerly known as Android Market). Android apps can also be downloaded from other online stores and additional third-party sites.

In addition to phone and Wi-Fi connectivity, current mobile computing devices are typically equipped with a variety of popular features, such as a web browser, a digital camera and apps to manage a library of photographs and videos, sound input/output hardware and apps for managing a library of audio recordings, Bluetooth, NFC, apps for interacting with social media sites, apps for reading print media, etc. These devices are also generally equipped with a GPS, and many apps provide services to users based on current physical location. The devices can also include input hardware such as an accelerometer, gyroscope and proximity sensor, which can be used to control and customize interaction with the user in a wide variety of different ways. Thus, a current mobile device puts a great deal of computing power in the user's pocket or purse.

Current mobile computing devices require a significant amount of power to run, and are powered by rechargeable batteries. A mobile computing device's battery is charged by connecting the device to an external power source, such as a wall socket via a USB connection and an adaptor. An external power source is not always available, and even when it is, charging a mobile device can be inconvenient for the user. Generally, improvements in mobile batteries have lagged behind developments in processors and other mobile computing technology. The limited capacity of the battery can be a weak point in the capabilities of a mobile device. With the intensive power demands of mobile devices, many users find that the amount of time for which battery power is available between changes is less than ideal. Therefore, it is desirable to conserve power to the extent practicable, and not drain the battery any faster than necessary.

For this reason, Android uses a sleep mode in which the screen is turned off and the operations of the system are suspended. This significantly decreases power consumption, and thus prolongs the battery life. Android puts a device into sleep mode after a given amount of time has passed without activity, or in response to an indication from the user (typically, a quick press of the power switch). However, Android allows apps to run background tasks when the screen is off and the mobile device would otherwise be in sleep mode, which can be useful but also draws power. It is desirable for some background activity to occur during these times. For example, a user may want to continue listening to music even after the screen times out in response to no user activity occurring for a given period of time, which requires that the music player continues to operate in the background with the screen off. As another example, a phone might be configured to periodically pull e-mail from a server when the screen is off and the phone would otherwise be sleeping. However, if background tasks are run too often or for too long, the battery can be drained significantly when the device is supposed to be sleeping. Some badly designed apps prevent the mobile device from sleeping in order to run their own background tasks without proper regard for power consumption, and thus run down the battery while the phone is meant to be in sleep mode.

It would be desirable to address these issues.

SUMMARY

Power consumption on a mobile computing device is reduced, by identifying and managing apps that disproportionally prevent the mobile computing device from going into sleep mode while the screen is off. It is detected when the screen of the mobile computing device is turned off and when it is subsequently turned back on. During the ensuing period of time while the screen is off, it is determined which specific apps on the mobile computing device prevent it from sleeping. This can take the form of identifying each specific app on the mobile computing device that has an unreleased wake lock at any point during the given period of time while the screen is off. For example, the wake lock status of each app on the mobile computing device can be read in response to the screen being turned off, such that each specific app that is holding a wake lock at that time is identified. While the screen is off, all wake lock acquisitions and wake lock releases by specific apps can be detected. The wake lock status of each app can be read again in response to the screen being turned back on, to identify each app that is holding a wake lock then. This information unearths all apps on the mobile computing device that prevented it from sleeping during the given period of screen-off time. The wake locks in question can be of a type which prevents the CPU from sleeping but allows the screen to be turned off, such as those of Android type PARTIAL_WAKE_LOCK. A reflection API (e.g., the Android Java reflection API) can be used to glean this type of information concerning specific apps on the mobile computing device preventing it from sleeping while the screen is off.

For each app determined to have prevented the mobile computing device from sleeping while the screen was off, the prevention by that specific app is quantified according to power consumption. For example, the length of time during which each app prevented the mobile computing device from sleeping while the screen was off can be determined, and the quantification can be based on these lengths of time, since the longer the device is prevented from sleeping the greater the power that is consumed, all else being equal. These lengths of time can be determined by flagging a start and an end of each period of time that each specific app prevents the mobile device from sleeping while the screen is off, based on reading a system time counter a) when the screen is turned off, b) whenever a wake lock is acquired by an app while the screen is off, c) whenever a wake lock is released by an app while the screen is off, and d) when the screen is turned back on. If a single app prevents the device from sleeping for multiple, separate periods of time during a single period of time when the screen is off, the lengths of each of these separate periods are added to calculate the total length of time for that app. In other embodiments, the quantification can be based on additional factors instead of or in addition to duration. For example, usage of specific resources and execution of specific operations associated with power consumption can be monitored, and an app's prevention of the mobile computing device from sleeping can be quantified based at least in part on these activities.

Any apps for which the quantified prevention of the mobile computing device from sleeping while the screen was off meets a specific threshold are identified, and at least one further action is taken to manage these apps. For example, information concerning an identified app's prevention of the mobile computing device from sleeping while the screen is off can be output to the user of the mobile computing device and/or transmitted to a central server for tracking. Instead or in addition, an identified app can be blocked from preventing the mobile computing device from sleeping while the screen is off in the future, for example by killing the app when the screen is turned off.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
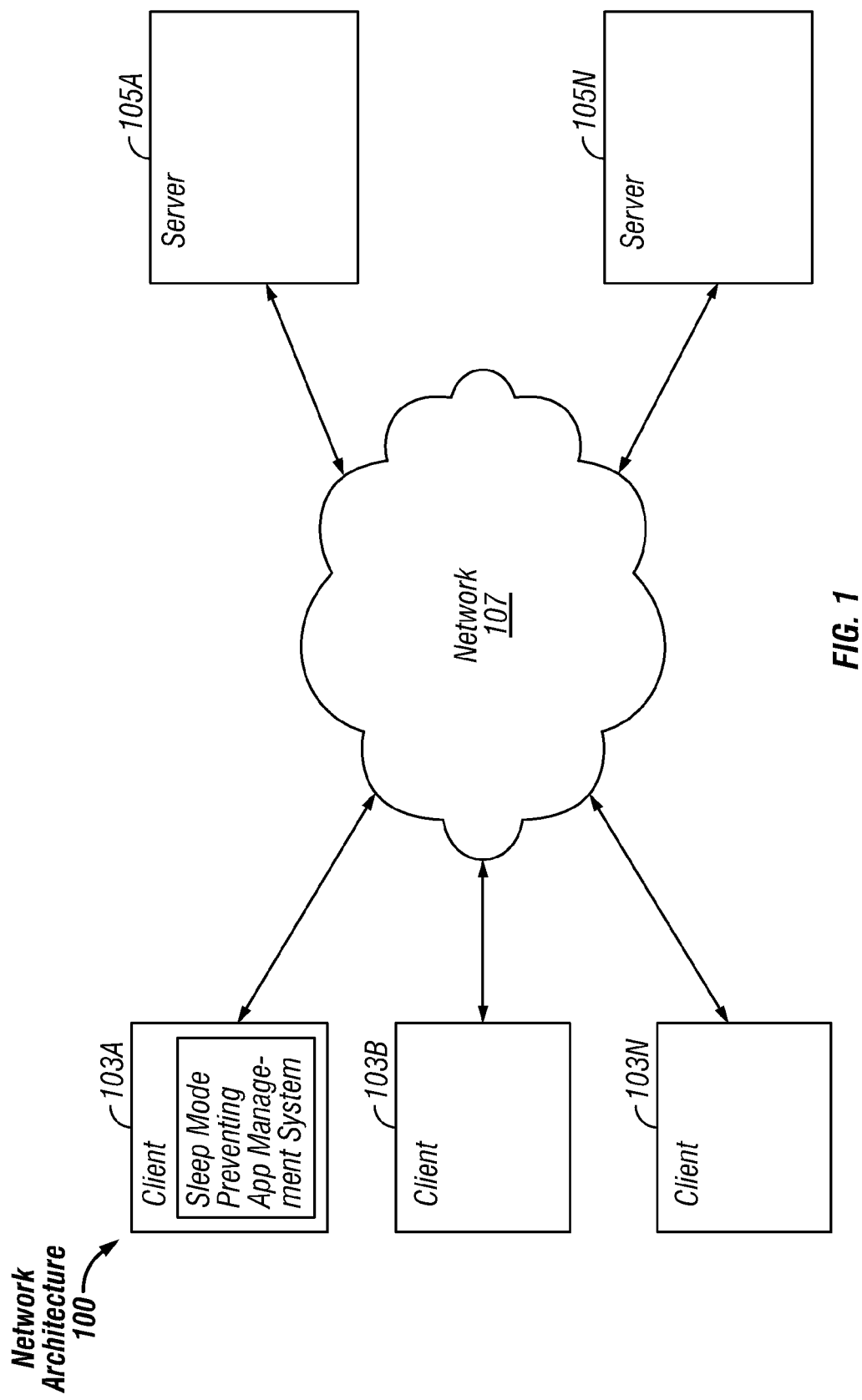
FIG. 1 is a block diagram of an exemplary network architecture in which a sleep mode preventing app management system can be implemented, according to some embodiments.

FIG. 1 is a block diagram illustrating an exemplary network architecture 100 in which a sleep mode preventing app management system 101 can be implemented. The illustrated network architecture 100 comprises multiple clients 103A, 103B and 103N, as well as multiple servers 105A and 105N. In FIG. 1, a sleep mode preventing app management system 101 is illustrated as residing on client 103A. It is to be understood that this is an example only, and in various embodiments various functionalities of this system 101 can be instantiated on a client 103, a server 105, or can be distributed between multiple clients 103 and/or servers 105.

Clients 103 and servers 105 can be implemented using computer systems 210 such as the one illustrated in FIG. 2 and described below. The clients 103 and servers 105 are communicatively coupled to a network 107, for example via a network interface 248 or modem 247 as described below in conjunction with FIG. 2. Clients 103 are able to access applications and/or data on servers 105 using, for example, a web browser or other client software (not shown). Clients 103 can be in the form of desktop/laptop computers, or various types of mobile computing devices 307. A mobile computing device 307 can be in the form of any portable computer system capable of connecting to a network 107 and running applications. Such mobile computing devices 307 are sometimes referred to as smartphones, although many mobile phones not so designated also have these capabilities. Tablet computers are another example of mobile computing devices 307. A laptop computer is also a form of mobile computing device 307, albeit one with somewhat less convenient portability.

Although FIG. 1 illustrates three clients 103 and two servers 105 as an example, in practice many more (or fewer) clients 103 and/or servers 105 can be deployed. In one embodiment, the network 107 is in the form of the Internet. Other networks 107 or network-based environments can be used in other embodiments.

Figure 2:
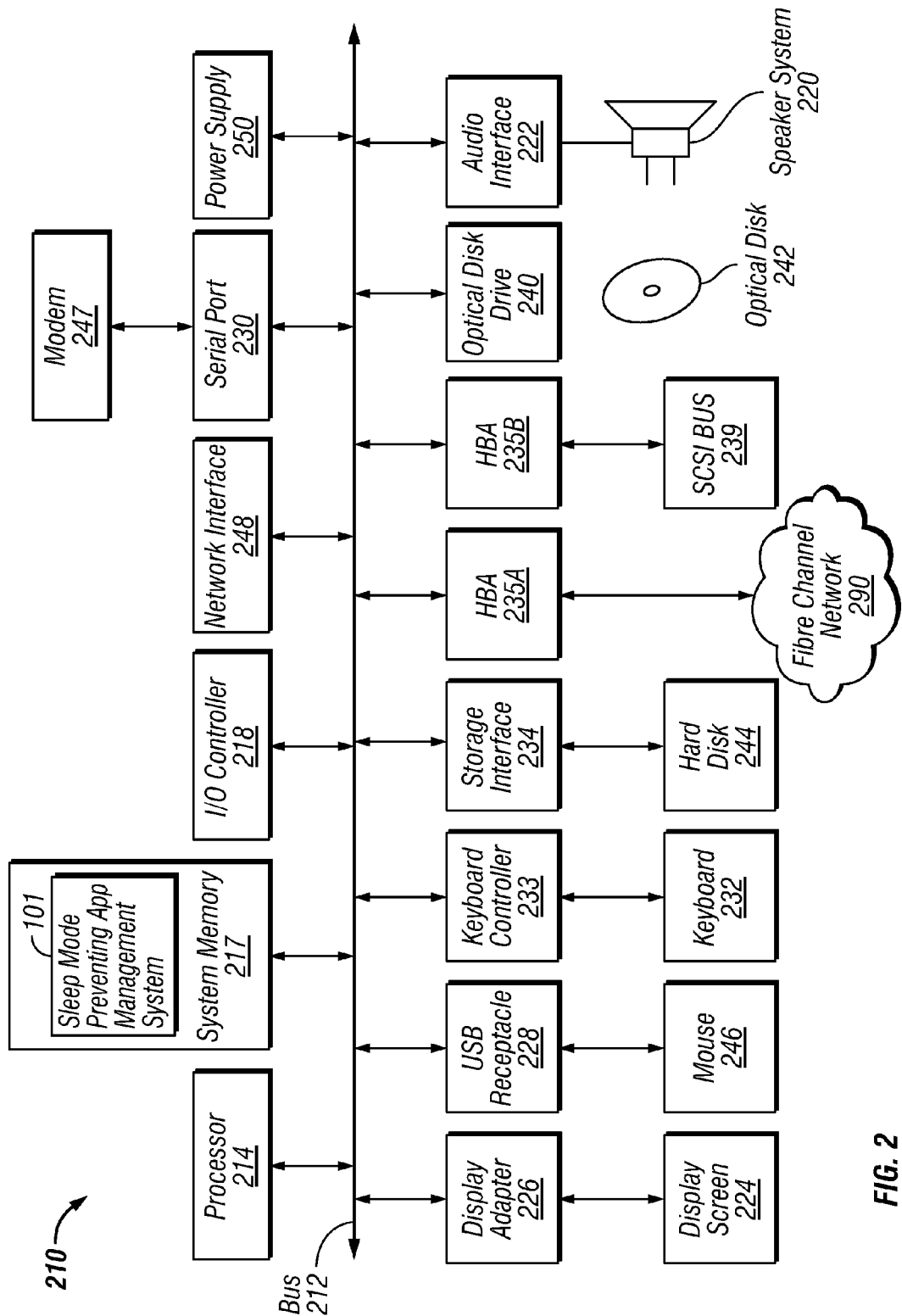
FIG. 2 is a block diagram of a computer system suitable for implementing a sleep mode preventing app management system, according to some embodiments.

FIG. 2 is a block diagram of a computer system 210 suitable for implementing a sleep mode preventing app management system 101. Both clients 103 and servers 105 can be implemented in the form of such computer systems 210. As illustrated, one component of the computer system 210 is a bus 212. The bus 212 communicatively couples other components of the computer system 210, such as at least one processor 214, system memory 217 (e.g., random access memory (RAM), read-only memory (ROM), flash memory), an input/output (I/O) controller 218, an audio output interface 222 communicatively coupled to an external audio device such as a speaker 220, a display adapter 226 communicatively coupled to an external video output device such as a display screen 224, one or more interfaces such as Universal Serial Bus (USB) receptacles 228, serial ports 230, parallel ports (not illustrated), etc., a keyboard controller 233 communicatively coupled to a keyboard 232, a storage interface 234 communicatively coupled to at least one hard disk 244 (or other form(s) of magnetic media), a host bus adapter (HBA) interface card 235A configured to connect with a Fibre Channel (FC) network 290, an HBA interface card 235B configured to connect to a SCSI bus 239, an optical disk drive 240 configured to receive an optical disk 242, a mouse 246 (or other pointing device) coupled to the bus 212 e.g., via a USB receptacle 228, a modem 247 coupled to bus 212, e.g., via a serial port 230, and one or more wired and/or wireless network interface(s) 248 coupled, e.g., directly to bus 212.

Other components (not illustrated) may be connected in a similar manner (e.g., document scanners, digital cameras, printers, etc.). Conversely, all of the components illustrated in FIG. 2 need not be present (e.g., smartphones and tablets typically do not have optical disk drives 240, external keyboards 242 or external pointing devices 246, although various external components can be coupled to mobile computing devices 307 via, e.g., USB receptacles 228). The various components can be interconnected in different ways from that shown in FIG. 2.

The bus 212 allows data communication between the processor 214 and system memory 217, which, as noted above may include ROM and/or flash memory as well as RAM. The RAM is typically the main memory into which the operating system and application programs are loaded. The ROM and/ or flash memory can contain, among other code, the Basic Input-Output system (BIOS) which controls certain basic hardware operations. Application programs can be stored on a local computer readable medium (e.g., hard disk 244, optical disk 242) and loaded into system memory 217 and executed by the processor 214. Application programs can also be loaded into system memory 217 from a remote location (i.e., a remotely located computer system 210), for example via the network interface 248 or modem 247. In FIG. 2, the sleep mode preventing app management system 101 is illustrated as residing in system memory 217. The workings of the sleep mode preventing app management system 101 are explained in greater detail below in conjunction with FIG. 3.

The storage interface 234 can be coupled to one or more hard disks 244 (and/or other standard storage media). The hard disk(s) 244 may be a part of computer system 210, or may be physically separate and accessed through other interface systems.

The network interface 248 and or modem 247 can be directly or indirectly communicatively coupled to a network 107 such as the Internet. Such coupling can be wired or wireless.

FIG. 2 also illustrates a power supply 250. In the case of a desktop computer, the power supply receives alternating current ("AC") from a mains power connection device such as a wall socket, and converts it into to low-voltage direct current ("DC") to operate the processor and peripheral devices. Laptops are typically powered by an internal rechargeable battery and an external power supply. The external power supply receives AC from a wall socket or the like, and outputs DC both to charge the battery and to power the laptop. When the external power supply is not connected, the laptop runs on power supplied by the battery. The power supply of a smartphone or tablet is typically in the form of rechargeable battery. Depending upon the model and configuration, the battery can be charged in a number of different ways, e.g., through a USB connection, through a connection to a wall socket using an AC adapter, through an automobile cigarette lighter using an adapter, or through a wireless charging interface.

Figure 3:
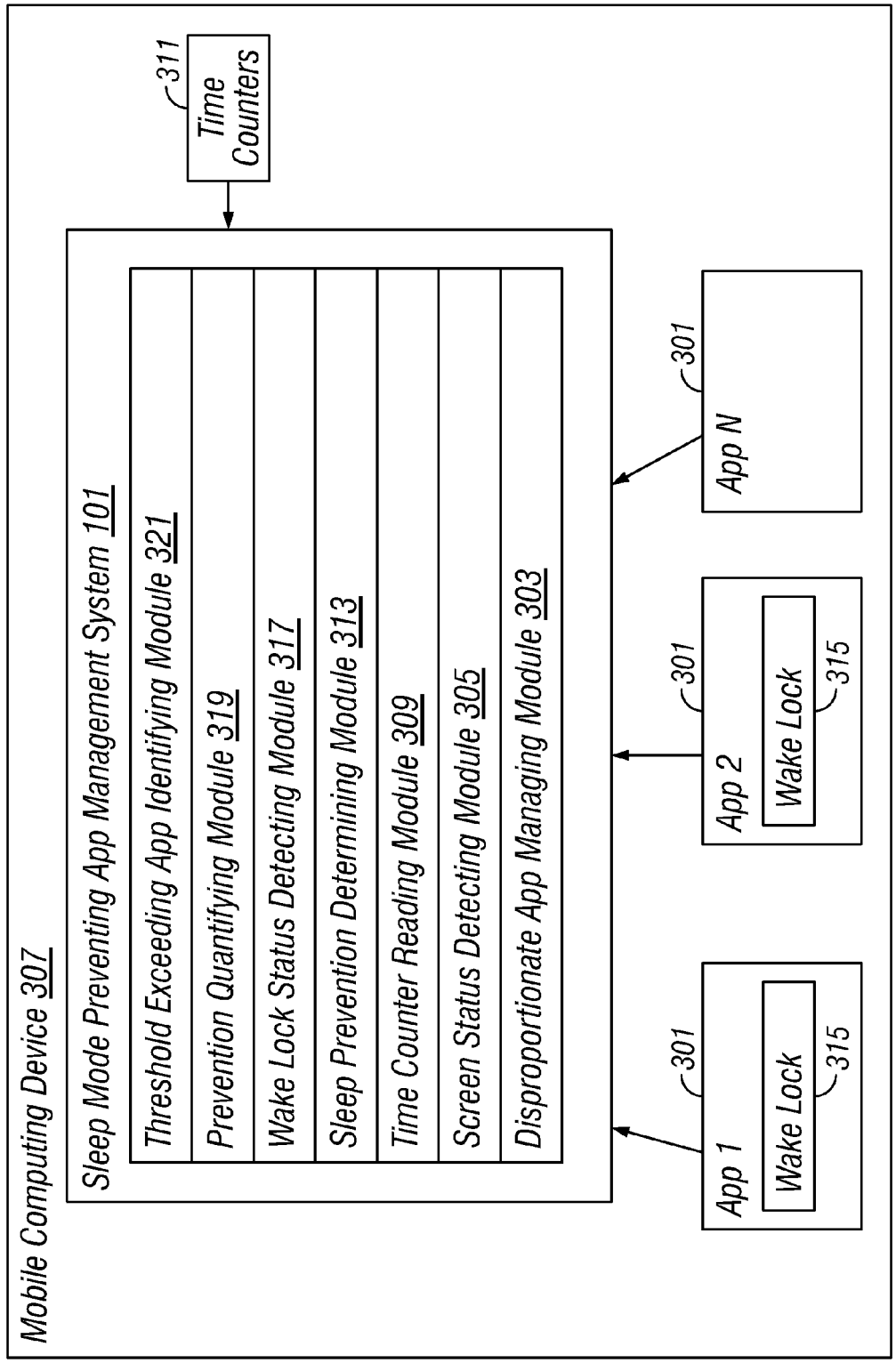
FIG. 3 is a block diagram of the operation of a sleep mode preventing app management system, according to some embodiments.

FIG. 3 illustrates the operation of a sleep mode preventing app management system 101, according to some embodiments. As described above, the functionalities of the sleep mode preventing app management system 101 can reside on a client 103, a server 105, or be distributed between multiple computer systems 210, including within a cloud-based computing environment in which the functionality of the sleep mode preventing app management system 101 is provided as a service over a network 107. It is to be understood that although the sleep mode preventing app management system 101 is illustrated in FIG. 3 as a single entity, the illustrated sleep mode preventing app management system 101 represents a collection of functionalities, which can be instantiated as a single or multiple modules as desired (an instantiation of specific, multiple modules of the sleep mode preventing app management system 101 is illustrated in FIG. 3). It is to be understood that the modules of the sleep mode preventing app management system 101 can be instantiated (for example as object code or executable images) within the system memory 217 (e.g., RAM, ROM, flash memory) of any computer system 210, such that when the processor 214 of the computer system 210 processes a module, the computer system 210 executes the associated functionality. As used herein, the terms "computer system," "computer," "client," "client computer," "server," "server computer" and "computing device" mean one or more computers configured and/or programmed to execute the described functionality. Additionally, program code to implement the functionalities of the sleep mode preventing app management system 101 can be stored on computer-readable storage media. Any form of tangible computer readable storage medium can be used in this context, such as magnetic or optical storage media. As used herein, the term "computer readable storage medium" does not mean an electrical signal separate from an underlying physical medium.

As illustrated in FIG. 3, a sleep mode preventing app management system 101 runs on a mobile computing device 307 (e.g., a smartphone or tablet) and identifies apps 301 that disproportionally run background tasks when the mobile computing device 307 is supposed to be sleeping. By identifying which apps 301 are preventing the mobile device from sleeping too often and/or for too long, the sleep mode preventing app management system 101 can manage the behavior of the apps 301 or enable the user 307 to do so, thereby preserving the life of the battery 250.

In order to identify apps 301 that are disproportionally running background tasks and preventing the mobile device 307 from sleeping, a screen status detecting module 305 of the sleep mode preventing app management system 101 detects when the screen 224 of the mobile computing device 307 is turned off, which indicates that the device 307 is supposed to be going into sleep mode. The screen 224 can be turned off in response to an explicit indication from the user (e.g., the user taps the power button), or as a result of timing out (i.e., a period of inactivity of a given length transpires). The screen 224 timeout period is a user configurable setting, which is typically set to a length of time ranging from seconds (e.g., 10 seconds, 20 seconds, 45 seconds) to minutes (e.g., 2 minutes, 10 minutes, 20 minutes). In any case, the screen status detecting module 305 detects when the screen 224 is turned off.

In some embodiments, when the screen 224 is turned off, a time counter reading module 309 of the sleep mode preventing app management system 101 reads one or more system time counters 311, in order to subsequently determine for how long various apps 301 prevent the mobile device 307 from sleeping during the period of time when the screen 224 was off. For example, Android maintains an uptime counter $311_{uptime}$, and a real-elapsed-time counter $311_{real\text{-}elapsed\text{-}time}$. Both of these counters 311 are initialized to zero when system boots. The uptime counter $311_{uptime}$ is only incremented when the CPU is active, and thus does not track time when the mobile device 307 is sleeping. By contrast, the real-elapsed-time counter $311_{real\text{-}elapsed\text{-}time}$ tracks the actual time since the last reboot, including time when the device 2307 is in sleep mode. The counter reading module 309 can thus read these or other counters 311 that enable the subsequent determination of the time period during which the screen 224 of the mobile device 307 is off, and any times within that window during which any app 301 prevented the mobile device 307 from sleeping. The process of making these determinations is described in greater detail below. It is to be understood that the specific formats (and names) of the counter(s) 311 can vary between different embodiments, for example based on the mobile OS (and version thereof) on the mobile computing device 307.

When the screen 224 is off, a sleep prevention determining module 313 of the sleep mode preventing app management system 101 determines whether any of the apps 301 on the device 307 are preventing the mobile computing device 307 from sleeping. The Android API provides a mechanism called a wake lock 315, which can be used by an app 301 to force the mobile device 307 to remain awake. To prevent the mobile device 307 from sleeping, an app 301 acquires a wake lock 315. When the app 301 no longer needs to prevent the device 307 from going into sleep mode, the app 301 releases the wake lock 315. As long as there is at least one unreleased wake lock 315 on the system, the device 307 cannot go into sleep mode. Under current versions of Android, wake locks 315 are instantiated as objects of the class WakeLock. The sample code in Table 1 illustrates an app 301 acquiring and subsequently releasing a wake lock 315 to prevent the mobile device 307 from sleeping when the screen 224 is off.

Table 1

// the class PowerManager provides control over the power state of the device
// call Context.getSystemService( ) to obtain PowerManager object pm
PowerManager pm=(PowerManager) getSystemService (Context.POWER_SERVICE);
// call newWakeLock( ) to create PowerManager.WakeLock object wl
// PARTIAL_WAKE_LOCK indicates to create wake lock that forces CPU to remain on
// but allows screen to be turned off
PowerManager.WakeLock wl=pm.newWakeLock(PowerManager.PARTIAL_WAKE_LOCK, "Example");
// acquire the wake lock
wl.acquire( );
// . . . CPU will stay on during this section . . .
// release the wake lock, CPU no longer prevented from sleeping
wl.release( );

Note that Android supports multiple kinds of wake locks 315, with the type specified by the value of the first parameter passed to the constructor pm.newWakeLock( ). It is wake locks 315 of the kind PARTIAL_WAKE_LOCK that are of interest in the context of the sleep mode preventing app management system 101, because the other kinds (SCREEN_DIM_WAKE_LOCK, SCREEN_BRIGHT_WAKE_LOCK and FULL_WAKE_LOCK) force the screen 224 to remain on as well as the CPU, and are thus not relevant to preventing the mobile computing device 307 from sleeping while the screen 224 is off.

As long as at least one PARTIAL_WAKE_LOCK is held, the CPU will remain on, regardless of the state of the screen 224, even if the user presses the power button. It is to be understood that under different versions of Android, the kinds of wake locks 315 and/or the names thereof may vary. Additionally, other mobile operating systems and/or versions of Android may provide a differently implemented (and/or differently named) mechanism that enables an app 301 to prevent the CPU from entering sleep mode while the screen 224 is off. Thus, although an embodiment using Android's PARTIAL_WAKE_LOCK. type wake locks 315 is described extensively herein, it is to be understood that in other embodiments the same functionality is implemented in the context of differently named and/or formatted mechanisms for preventing a mobile computing device 307 from sleeping while the screen 224 is off. In different embodiments, in order to perform the functionality described herein, the sleep prevention determining module 313 can utilize whatever resources are exposed by the relevant API (or are otherwise accessible) that allow apps 301 to prevent the CPU from entering sleep mode while the screen 224 is off.

In one embodiment, a wake lock status detecting module 317 of the sleep mode preventing app management system 101 reads the wake lock status of each app 301 on the mobile computing device 307 in response to the screen 224 being turned off. This enables the wake lock status detecting module 317 to identify which apps 301 were holding wake locks 315 of the kind PARTIAL_WAKE_LOCK at the time the screen 224 went off. Note that the public method WakeLock.isHeld( ) returns true if the wake lock 315 has been acquired but has not yet been released. In some embodiments, this method is used to determine an app's wake lock 315 status.

In addition, the wake lock status detecting module 317 can detect all acquisitions of PARTIAL_WAKE_LOCK type wake locks 315 while the screen 224 is off, in order to detect any apps 301 that acquire a wake lock after the screen 224 has already been turned off but before it has been turned back on. When the acquisition of such a wake lock 315 is detected, the time counter reading module 309 can read the relevant system time counter(s) 311 to note the time of acquisition, which will subsequently be used to determine the length of time the wake lock 315 was held while the screen 224 was off.

To complete the picture, the wake lock status detecting module 317 can also detect all releases of PARTIAL_WAKE_LOCK type wake locks 315 while the screen 224 is off, in which case the time counter reading module 309 reads the system time counter(s) 311 and records the release time. Thus, wake lock 315 releases by apps 301 after the screen 224 has already been turned off but before it has been turned back on are also detected.

Finally, the screen status detecting module 305 detects when the screen 224 is turned back on, the time counter reading module 309 reads the system time counter(s) 311, and the wake lock status detecting module 317 reads the wake lock 315 status of each app 301 again to determine which apps 301 are still holding PARTIAL_WAKE_LOCK wake locks 315 when the screen 224 is turned back on.

By detecting when the screen 224 is turned off and then back on, determining which apps 301 are holding PARTIAL_WAKE_LOCK wake locks 315 at these times, and detecting and recording the times of all acquisitions and releases of PARTIAL_WAKE_LOCK. wake locks 315 while the screen 224 is off, all of the information is gleaned for determining the lengths of time for which each app 301 prevents the mobile device 307 from sleeping while the screen 224 is off, as described in more detail below.

In order to access an app's wake lock 315 information at runtime, the wake lock status detecting module 317 can use the Android Java reflection API. In the context of computer programming, reflection is the ability of a computer program to examine and modify the structure and behavior of an object at runtime. In an object oriented programming language such as Java (in which Android apps 301 are typically written), reflection makes it possible to inspect classes, interfaces, fields and methods at runtime, without knowing their names at compile time. Java reflection also makes it possible to instantiate new objects, invoke methods and get/set field values using reflection. Android provides a Java reflection API in the package java.lang.reflect. in other embodiments, other APIs are used to glean this information, such as the native API.

A prevention quantifying module 319 of the sleep mode preventing app management system 101 quantifies each app's prevention of the mobile computing device from sleeping while the screen 224 is off, according to power consumption. In one embodiment, this quantification is in the form of using the information gleaned as described above to determine lengths of time for which apps 301 prevent the mobile device 307 from sleeping while the screen 224 is off. For each app 301 determined to have prevented the app from sleeping while the screen 224 was off (e.g., any app 301 which held a PARTIAL_WAKE_LOCK type wake lock 315 at any point during which the screen 224 was off), the start and end of the prevention time are identified, and the difference between them indicates the duration (e.g., in a unit such as milliseconds, seconds, etc.). The start time is either the time at which the screen 224 was turned off (for apps 301 that were holding a wake lock 315 when the screen 224 went off), or the time at which the app 301 acquired the wake lock 315 (for apps 301 which made the acquisition during the period of time when the screen 224 was off). Conversely, the end time is either the time at which the screen 224 went back on (for apps 301 that were still holding the wake lock 315 at this point) or the time at which the app 301 released the wake lock 315 (for apps 301 which performed the release before the screen 224 was turned back on). In the case were a single app 301 held a wake lock 315 for multiple periods of time during a single screen 224 off period (e.g., the app acquired and released the wake lock 315 multiple times while the screen 224 was off), the above described functionality captures the corresponding information for each of these time periods, and the length of time during which the app prevented the mobile device 307 from sleeping is calculated as the sum of the lengths of each separate prevention period. The measurement of the length of time each app 301 prevents the mobile device 301 from sleeping when the screen 224 is off is in effect a quantification thereof according to power consumption. This is so because, all else being equal, the longer the app 301 prevents the mobile device 307 from sleeping, the more power the app 301 is causing the device 307 to consume when the device 307 is supposed to be in sleep mode.

In one embodiment, the difference between the real-elapsed-time and uptime that transpires during the screen 224 off period is calculated using the corresponding counters 311, and only in response to the uptime exceeding a given threshold (e.g., as a percentage of the total elapsed time or as a fixed value) are the sleep prevention times of individual apps 301 determined and analyzed. The reason for this is that where the threshold of uptime is not reached, no individual app 301 could be preventing the device 307 from sleeping to an extent of interest to that embodiment, with the floor being indicated by the threshold. The specific value of the threshold is a variable design parameter which can be set or adjusted as desired.

In some embodiments, the prevention quantifying module 319 quantifies each app's prevention of the mobile computing device 307 from sleeping while the screen 224 is off according to power consumption based on additional factors instead of or in addition to duration. More specifically, the sleep mode preventing app management system 101 can monitor not only the times during which specific apps 301 prevent the mobile device 307 from sleeping while the screen 224 is off, but also specific power draining activity the app 301 initiates during that time. More specifically, the reflection (and/or native) API(s) can be used to monitor an app's usage of specific resources associated with power consumption, such as motion sensors, GPS, network, battery 250, etc. The execution of specific power consuming operations by an app 301 can also be monitored. The prevention of the device from sleeping while the screen 224 is off can thus be more finely quantified by taking such power consuming activity into account. Which specific resources and operations to track and how specifically to weigh them in the quantification are variable design parameters, and different formulations can be utilized in different embodiments as desired.

A threshold exceeding app identifying module 321 of the sleep mode preventing app management system 101 identifies any apps 301 for which the quantified prevention exceeds a given threshold. The specific value of the threshold is a variable design parameter which can be set or adjusted as desired. In this context, the threshold represents a value above which the quantified prevention of the device from sleeping by a given app 301 is considered disproportionate, and hence desirable to manage.

In different embodiments, a disproportionate app managing module 303 of the sleep mode preventing app management system 101 performs one or more additional step(s) to manage any apps 301 identified as disproportionate sleep preventers. In one embodiment, this takes the form of informing the user (e.g., through a GUI) that the given app(s) 301 are preventing the mobile device 307 from sleeping while the screen 224 is off, with optional additional information such as for how long, at what expense to 250 battery life, by performing which operations, etc. The disproportionate app managing module 303 can also block disproportionate apps 301 from preventing the device 307 from sleeping while the screen 224 is off, for example by killing the disproportionate apps 301 when the screen 224 goes off and restarting them when the screen 224 goes back on, by using the reflection API to prevent the apps 301 from performing specific operations targeting specific resources, etc. Identified disproportionate apps 301 and information concerning their detected activities can also be transmitted to a central server (not illustrated in FIG. 3) or the like for tracking.

Note that although the above based discussion is centered on embodiments in which the sleep mode preventing app management system 101 runs under Android, the above described functionality can be applied under other mobile operating systems in other embodiments, provided that the mobile operating system in question allows the detection and identification of information concerning sleep mode and prevention thereof, similar in scope to that described above.

Figure 4:
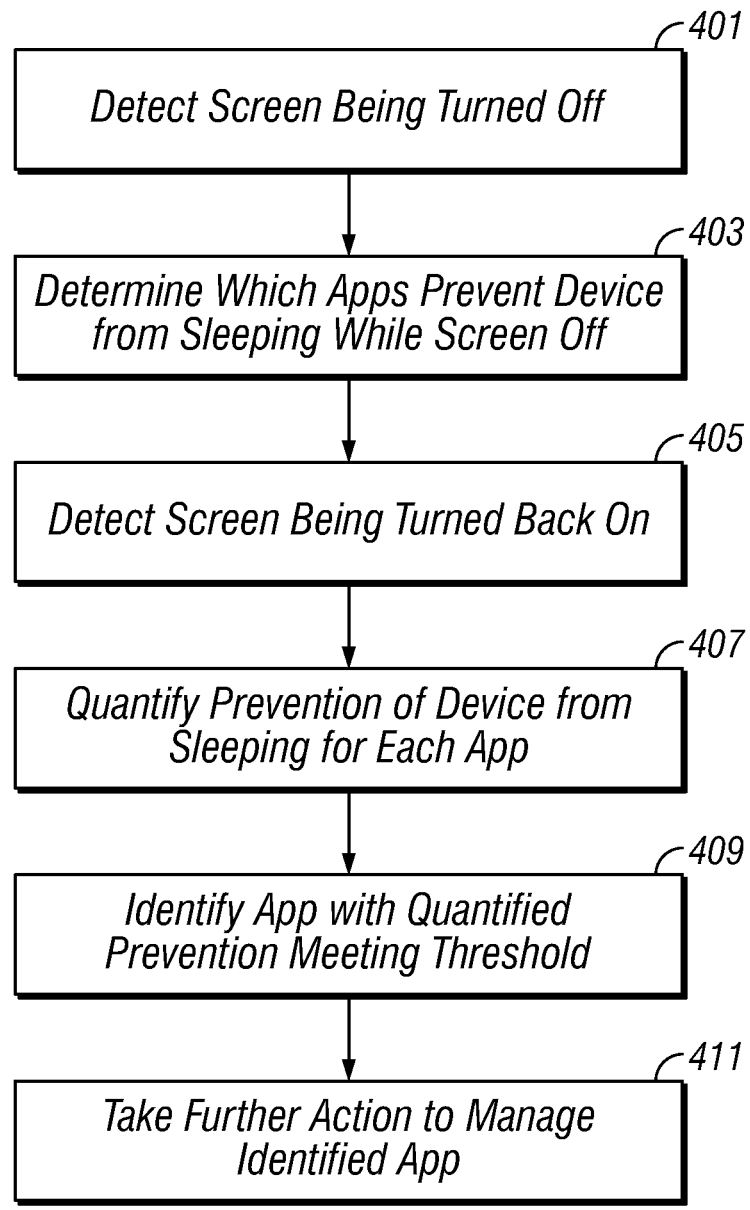
FIG. 4 is a flowchart of the operation of a sleep mode preventing app management system, according to some embodiments.

FIG. 4 illustrates steps of the operation of a sleep mode preventing app management system 101, according to some embodiments. The screen status detecting module 305 detects 401 the screen 224 of the mobile computing device 307 being turned off. The sleep prevention determining module 313 determines 403 which specific apps 301 on the mobile computing device 307 prevent it from sleeping while the screen 224 is off. The screen status detecting module 305 detects 405 the screen 224 of the mobile computing device 307 subsequently being turned back on. The prevention quantifying module 319 quantifies 407 prevention of the mobile computing device 307 from sleeping while the screen 224 was off, according to power consumption, for each specific app 301 determined to have prevented the mobile computing device 307 from sleeping while the screen 224 was off. The threshold exceeding app identifying module 321 identifies 409 an app for which the quantified prevention of the mobile computing device 307 from sleeping while the screen 224 was off meets a specific threshold. The disproportionate app managing module 303 takes at least one further action to manage the identified app's prevention of the mobile computing device 307 from sleeping while the screen 224 is off.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for reducing power consumption on a mobile computing device with a screen, a battery, a central processing unit ("CPU") and a mobile operating system, by identifying apps that disproportionately prevent the mobile computing device from going into sleep mode while the screen is off, the method comprising:
   detecting the screen of the mobile computing device being turned off;
   determining which specific apps on the mobile computing device prevent the mobile computing device from sleeping while the screen is off;
   subsequently to the screen having been turned off, detecting the screen of the mobile computing device being turned back on;
   for each specific app determined to have prevented the mobile computing device from sleeping while the screen was off, quantifying the specific app's prevention of the mobile computing device from sleeping while the screen was off, according to power consumption, wherein quantifying a specific app's prevention of the mobile computing device from sleeping while the screen was off according to power consumption further comprises determining a corresponding length of time during which the specific app prevented the mobile computing device from sleeping while the screen was off, and quantifying the specific app's prevention of the mobile computing device from sleeping while the screen was off in proportion to the corresponding length of time;
   identifying at least one specific app for which the quantified prevention of the mobile computing device from sleeping while the screen was off meets a specific threshold; and
   taking at least one further action to manage the at least one specific identified app's prevention of the mobile computing device from sleeping while the screen is off.

2. The method of claim 1 wherein determining which specific apps prevent the mobile computing device from sleeping while the screen is off further comprises:
   identifying each specific app on the mobile computing device that has an unreleased wake lock at any point during a given period of time while the screen of the mobile computing device is off.

3. The method of claim 2 wherein identifying each specific app on the mobile computing device that has an unreleased wake lock at any point during the given period of time while the screen of the mobile computing device is off further comprises:
   reading a wake lock status of each app on the mobile computing device in response to detecting the screen of the mobile computing device being turned off;
   identifying each specific app on the mobile computing device that is holding a wake lock when the screen of the mobile computing device is turned off;
   detecting all wake lock acquisitions and wake lock releases by specific apps on the mobile computing device while the screen is off;
   reading a wake lock status of each app on the mobile computing device in response to detecting the screen of the mobile computing device being turned back on; and
   identifying each specific app on the mobile computing device that is holding a wake lock when the screen of the mobile computing device is turned back on.

4. The method of claim 2 wherein:
   each wake lock is of a type which prevents the central processing unit from sleeping but allows the screen to be turned off.

5. The method of claim 1 wherein determining lengths of time during which specific apps had prevented the mobile device from sleeping while the screen was off further comprises:
   determining a start and an end of each period of time that each specific app prevents the mobile device from sleeping while the screen is off, based on reading a system time counter a) when the screen is turned off, b) whenever a wake lock is acquired by an app while the screen is off, c) whenever a wake lock is released by an app while the screen is off, and d) when the screen is turned back on.

6. The method of claim 1 wherein determining lengths of time during which specific apps had prevented the mobile device from sleeping while the screen was off further comprises:
   for at least one specific app, identifying multiple, separate periods of time during which the specific app prevents the mobile computing device from sleeping, wherein each of the multiple, separate periods of time occur during a single period of time when the screen is off; and
   adding lengths of each of the multiple, separate periods of time to calculate a total length of time for the specific app.

7. The method of claim 1 wherein quantifying a specific app's prevention of the mobile computing device from sleeping while the screen was off according to power consumption further comprises:
   monitoring usage by the specific app of specific resources associated with power consumption, while the specific app is preventing the mobile computing device from sleeping while the screen is off; and
   quantifying the specific app's prevention of the mobile computing device from sleeping while the screen was off based at least in part on the specific app's monitored usage of specific resources associated with power consumption.

8. The method of claim 1 wherein quantifying a specific app's prevention of the mobile computing device from sleeping while the screen was off according to power consumption further comprises:
   monitoring execution by the specific app of specific operations associated with power consumption, while the specific app is preventing the mobile computing device from sleeping while the screen is off; and
   quantifying the specific app's prevention of the mobile computing device from sleeping while the screen was off based at least in part on the specific app's monitored execution of specific operations associated with power consumption.

9. The method of claim 1 wherein taking a further action to manage a specific identified app's prevention of the mobile computing device from sleeping while the screen is off further comprises:
   outputting information concerning the specific identified app's prevention of the mobile computing device from sleeping while the screen is off to a user of the mobile computing device.

10. The method of claim 1 wherein taking a further action to manage a specific identified app's prevention of the mobile computing device from sleeping while the screen is off further comprises:
blocking the specific identified app from preventing the mobile computing device from sleeping while the screen is off.

11. The method of claim 1 wherein taking a further action to manage a specific identified app's prevention of the mobile computing device from sleeping while the screen is off further comprises:
transmitting information concerning the specific identified app's prevention of the mobile computing device from sleeping while the screen is off to a central server for tracking.

12. The method of claim 1 wherein:
the mobile operating system consists of Android; and
Android PARTIAL_WAKE_LOCK type wake locks are utilized to determine which specific apps on the mobile computing device prevent the mobile computing device from sleeping while the screen is off.

13. The method of claim 1 further comprising:
utilizing a reflection application programming interface ("API") to glean information concerning specific apps on the mobile computing device preventing the mobile computing device from sleeping while the screen is off.

14. At least one non-transitory computer readable-storage medium for reducing power consumption on a mobile computing device with a screen, a battery, a central processing unit ("CPU") and a mobile operating system, by identifying apps that disproportionally prevent the mobile computing device from going into sleep mode while the screen is off, the at least one non-transitory computer readable-storage medium storing computer executable instructions that, when loaded into computer memory and executed by at least one processor of a computing device, cause the computing device to perform the following steps:
detecting the screen of the mobile computing device being turned off;
determining which specific apps on the mobile computing device prevent the mobile computing device from sleeping while the screen is off;
subsequently to the screen having been turned off, detecting the screen of the mobile computing device being turned back on;
for each specific app determined to have prevented the mobile computing device from sleeping while the screen was off, quantifying the specific app's prevention of the mobile computing device from sleeping while the screen was off, according to power consumption, wherein quantifying a specific app's prevention of the mobile computing device from sleeping while the screen was off according to power consumption further comprises determining a corresponding length of time during which the specific app prevented the mobile computing device from sleeping while the screen was off, and quantifying the specific app's prevention of the mobile computing device from sleeping while the screen was off in proportion to the corresponding length of time;
identifying at least one specific app for which the quantified prevention of the mobile computing device from sleeping while the screen was off meets a specific threshold; and
taking at least one further action to manage the at least one specific identified app's prevention of the mobile computing device from sleeping while the screen is off.

15. The at least one non-transitory computer readable-storage medium method of claim 14 wherein determining which specific apps prevent the mobile computing device from sleeping while the screen is off further comprises:
identifying each specific app on the mobile computing device that has an unreleased wake lock at any point during a given period of time while the screen of the mobile computing device is off.

16. The at least one non-transitory computer readable-storage medium method of claim 15 wherein identifying each specific app on the mobile computing device that has an unreleased wake lock at any point during the given period of time while the screen of the mobile computing device is off further comprises:
reading a wake lock status of each app on the mobile computing device in response to detecting the screen of the mobile computing device being turned off;
identifying each specific app on the mobile computing device that is holding a wake lock when the screen of the mobile computing device is turned off;
detecting all wake lock acquisitions and wake lock releases by specific apps on the mobile computing device while the screen is off;
reading a wake lock status of each app on the mobile computing device in response to detecting the screen of the mobile computing device being turned back on; and
identifying each specific app on the mobile computing device that is holding a wake lock when the screen of the mobile computing device is turned back on.

17. The at least one non-transitory computer readable-storage medium method of claim 14 wherein determining lengths of time during which specific apps had prevented the mobile device from sleeping while the screen was off further comprises:
determining a start and an end of each period of time that each specific app prevents the mobile device from sleeping while the screen is off, based on reading a system time counter a) when the screen is turned off, b) whenever a wake lock is acquired by an app while the screen is off, c) whenever a wake lock is released by an app while the screen is off, and d) when the screen is turned back on.

18. The at least one non-transitory computer readable-storage medium method of claim 14 wherein determining lengths of time during which specific apps had prevented the mobile device from sleeping while the screen was off further comprises:
for at least one specific app, identifying multiple, separate periods of time during which the specific app prevents the mobile computing device from sleeping, wherein each of the multiple, separate periods of time occur during a single period of time when the screen is off; and
adding lengths of each of the multiple, separate periods of time to calculate a total length of time for the specific app.

19. A mobile computing device configured for reducing power consumption by identifying apps that disproportionally prevent the mobile computing device from going into sleep mode, the computer system comprising:
a central processing unit;
system memory;
a screen;
a battery;
a screen status detecting module residing in the system memory, the screen status detecting module being programmed to detect the screen of the mobile computing device being turned off and to detect the screen of the mobile computing device being subsequently turned back on;

a sleep prevention determining module residing in the system memory, the sleep prevention determining module being programmed to determine which specific apps on the mobile computing device prevent the mobile computing device from sleeping while the screen is off;

a prevention quantifying module residing in the system memory, the prevention quantifying module being programmed to quantify prevention of the mobile computing device from sleeping while the screen was off, according to power consumption, for each specific app determined to have prevented the mobile computing device from sleeping while the screen was off, wherein quantifying a specific app's prevention of the mobile computing device from sleeping while the screen was off according to power consumption further comprises determining a corresponding length of time during which the specific app prevented the mobile computing device from sleeping while the screen was off, and quantifying the specific app's prevention of the mobile computing device from sleeping while the screen was off in proportion to the corresponding length of time;

a threshold exceeding app identifying module residing in the system memory, the threshold exceeding app identifying module being programmed to identify at least one specific app for which the quantified prevention of the mobile computing device from sleeping while the screen was off meets a specific threshold; and a disproportionate app managing module residing in the system memory, the disproportionate app managing module being programmed to take at least one further action to manage the at least one specific identified app's prevention of the mobile computing device from sleeping while the screen is off.

20. The computer system of claim 19 wherein determining lengths of time during which specific apps had prevented the mobile device from sleeping while the screen was off further comprises:

determining a start and an end of each period of time that each specific app prevents the mobile device from sleeping while the screen is off, based on reading a system time counter a) when the screen is turned off, b) whenever a wake lock is acquired by an app while the screen is off, c) whenever a wake lock is released by an app while the screen is off, and d) when the screen is turned back on.

* * * * *